March 12, 1968     D. A. AVNER ET AL     3,372,776
LUBRICATING MEANS FOR PISTON ROD SEAL
Filed March 2, 1966     2 Sheets-Sheet 1

United States Patent Office 3,372,776
Patented Mar. 12, 1968

3,372,776
LUBRICATING MEANS FOR PISTON ROD SEAL
David Alan Avner and Douglas Bryan Wilkins, Tyseley, Birmingham, England, assignors to Girling Limited
Filed Mar. 2, 1966, Ser. No. 531,154
Claims priority, application Great Britain, Mar. 2, 1965, 8,859/65
5 Claims. (Cl. 188—100)

ABSTRACT OF THE DISCLOSURE

The invention is concerned with the lubrication of a piston rod seal in a telescopic damper in which the working space within a cylinder contains both damper fluid and gas under pressure, and the piston rod extends through the end of the cylinder which is normally uppermost in use, so that the cushion of pressurized gas is disposed adjacent the piston rod seal. This is achieved by the provision of means defining a passage which extends from below the general level of damper fluid, upwardly to the vicinity of the piston rod seal, the passage being of such narrow dimensions that damper fluid can rise upwardly in the passage and remain therein due to a form of capillary action. In the specific embodiments, this is achieved by the provision of a tubular body which in one case, is closely spaced from the piston rod itself leaving a narrow clearance which forms the passage, and in the other embodiment the tubular body is closely spaced from the internal surface of the cylinder. In each case, a transverse flange at the upper end of the body is narrowly spaced from a piston rod guide to provide a horizontal portion of the said passage.

DETAILED DESCRIPTION

This invention is concerned with improvement in and relating to dampers and it is an object of the invention to provide lubrication of a piston rod seal in a damper.

There have been various proposals for ensuring adequate lubrication of the piston rod seal, including the insertion of a body surrounding the piston rod above the seal, the purpose of the body being to define, with the piston rod, a passage which can be filled with grease or other lubricant. In this case, as in others, the seal is submerged in the damper fluid, thereby complicating the construction.

The present invention, however, permits lubrication of the seal by the damper fluid, even though the general level of damper fluid is below the seal.

In accordance with the invention there is provided a telescopic damper comprising a cylinder containing damper fluid, and a quantity of gas under pressure a piston in the cylinder member, said fluid and said gas having a free fluid gas interface within said member, a piston rod secured to the piston and extending into the cylinder through a seal positioned above the general level of the fluid for sealing said piston rod against the pressure of said gas, and means defining a passage whose lower end is always below the level of the liquid, the passage being so dimensioned and arranged that damper fluid can reach the seal through the passage and can remain in the passage for lubrication of the seal.

The construction of the damper can thus be substantially simplified, compared with prior arrangements, without any loss of efficiency. Lubrication of the piston seal is maintained even if the damper remains in an extended state for a long period.

Preferably, the passage comprises a clearance between, on the one hand, a body through which the piston rod extends below the seal, and on the other hand, the piston rod or the cylinder. Such an arrangement provides a simple means of setting the clearance, without unduly complicating assembly of the damper.

Figure 1:
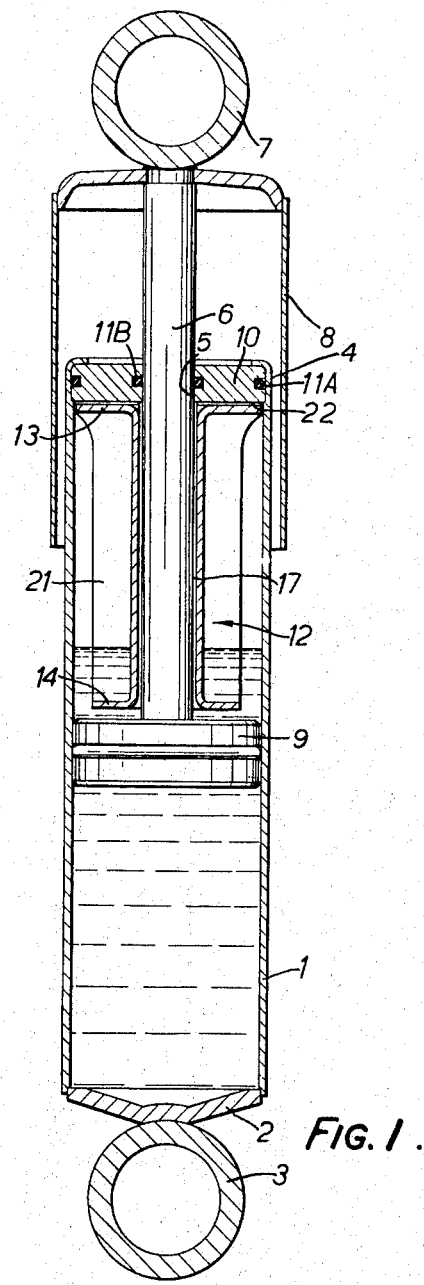
Figure 2:
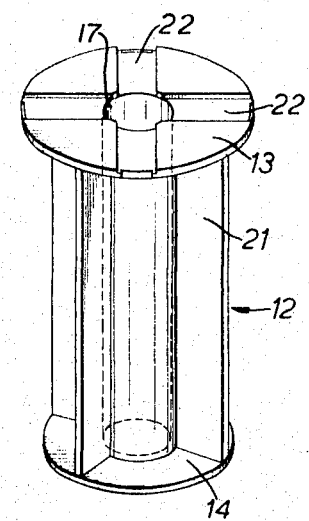
Figure 3:
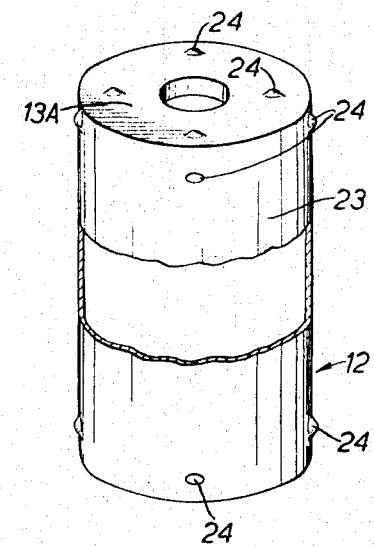

Features and advantages of the present invention will appear from the following description of some embodiments thereof, given by way of example only, reference being had to the accompanying drawings, in which:

FIGURE 1 is an axial section through a damper in accordance with the invention; and FIGURES 2 and 3 are perspective views of two forms of tubular body.

The damper shown in FIGURE 1 comprises a cylinder 1 closed at 2, there having securing means 3 and closed at the end 4 but for a passage 5 for a piston rod 6. The piston rod has securing means 7 and a skirt 8, to exclude dust and flying particles which might scar the piston rod, and carries a piston 9 with passages therethrough in known manner.

The cylinder end 4 is here closed by a piston rod guide 10, a cylinder seal 11A and a piston rod seal 11B. Abutting the guide 10 is a tubular body 12, having radial flanges 13, 14, and longitudinal reinforcing webs 21. The body has a passage 17 for the piston rod, clearance being provided and radial grooves 22 at the upper face communicating with the passage 17. The form of the body is shown in more detail in FIGURE 2.

In operation the damper is connected between the sprung and unsprung parts of the vehicle and the liquid level lies above the lower end of the passage 17 even at full extension of the damper. The gas above the liquid is pressurized to permit the damper to function in both directions of operation.

The piston rod passage clearance and the radial grooves enable liquid to reach the seals 11A and 11B to lubricate them and assist in keeping the seals gas tight even though the vehicle may remain static for considerable periods.

On full extension of the damper the fluid level is still above the lower end of the body, and thus in communication with the lower end of the passage.

The body may be made either as a metallic diecasting, fabricated or as a plastic moulding and may be provided with longitudinally extending webs between its end flanges. The body may have to be strong enough to withstand the shock of engagement of the piston on full extension.

In a damper having an internal diameter of 1.8 ins. (46 mm.) and a gas space of about 6½ cu. ins. (106.5 cc.), the clearance between the lower end of the body from the inside of the cylinder is about ³⁄₃₂ ins. (0.5 cm.) and the clearance round the piston rod is about (0.025 cm.) 10 thousandths of an inch.

It is not completely understood why the damper fluid should pass along and remain the clearance around the piston rod, but it is thought that some form of capillary action is responsible. The dimensions quoted above are given purely by way of illustration. Appropriate dimensions for any given damper which will ensure the fluid remaining in the clearance can readily be found by simple trial.

The modified body 12 shown in FIGURE 3 comprises an outer tubular portion 23 formed with small protuberances 24 which serve to locate against the cylinder 1 and thereby preserve a narrow annular clearance between the body and the cylinder. This clearance provides a passage for damper fluid to reach the seal 11A. A second clearance leading to the piston rod seal 11B is bounded by a peripheral flange 13A and by the piston rod guide 10, the flange being held spaced from the guide by further protuberances 24. As in the above described embodiments, the dimensions and arrangement of the clearances is so chosen that damper fluid can pass through the clearances and remain in them to lubricate the seals 11, 11A and 11B.

The main advantage of the constructions described is that in a damper when installed with the rod emerging from the top without a movable separator having a sealing engagement with the inside of the cylinder, the seal at the top of the cylinder is kept in contact with damper liquid thereby considerably easing the problem of providing an effective seal.

It will be appreciated that many other variations and modifications in the described embodiments will be possible within the scope of the invention.

What we claim is:

1. A telescopic damper comprising a cylinder member, a damper fluid and a quantity of gas under pressure in said cylinder member, said fluid and said gas having a free fluid/gas interface within said member, a piston in said cylinder member, a piston rod member secured to said piston and extending into said cylinder member, a piston rod seal attached to said cylinder member for sealing said piston rod member against the pressure of said gas, said seal being positioned above the general level of said fluid/gas interface, and means defining a passage having an open lower end below the level of said fluid/gas interface and an open upper end extending towards and terminating adjacent to said piston rod seal, said passage serving to conduct fluid to said piston rod seal and having a sufficiently small cross sectional dimension that fluid in said passage is retained therein for lubrication of said seal at all times including periods when said damper is static.

2. A damper as claimed in claim 1, comprising a body surrounding said piston rod member within said cylinder member and below said seal, said body co-operating with one of said members to define said passage.

3. A damper as claimed in claim 1, comprising a piston rod guide attached to said cylinder member, a guide seal carried by said guide to seal said guide to said cylinder member, and means defining a second passage dimensioned and arranged to lead damper fluid from said first passage to said guide seal and to retain damper fluid therein to lubricate said guide seal.

4. A damper as claimed in claim 3 comprising a tubular body surrounding said piston rod member below said piston rod seal, said tubular body and said piston rod member defining said first passage, and a peripheral flange at the upper end of said tubular body, said peripheral flange bounding said second passage.

5. A damper as claimed in claim 1, comprising a piston rod guide attached to said cylinder member and carrying said piston rod seal, a guide seal carried by said piston rod guide to seal said guide to said cylinder member, a tubular body surrounding said piston rod member below said piston rod guide, said body having a peripheral wall narrowly spaced from said cylinder member, and an inwardly projecting peripheral flange at the upper end of said body, said body and said flange cooperating with said cylinder member and said piston rod guide to form continuous passages for leading damper fluid to said seals and for retaining said damper fluid for lubrication of said seals.

References Cited

UNITED STATES PATENTS

| | | | |
|---|---|---|---|
| 3,164,381 | 1/1965 | Tuczek | 188—100 XR |
| 1,966,310 | 7/1934 | Padgett. | |
| 2,667,348 | 1/1954 | Frye et al. | 267—64 |
| 3,042,154 | 7/1962 | Zeidler | 188—100 |
| 3,076,643 | 2/1963 | Bittel | 188—100 X |

MILTON BUCHLER, *Primary Examiner.*

FERGUS S. MIDDLETON, GEORGE E. HALVOSA,
*Examiners.*